UNITED STATES PATENT OFFICE.

GUSTAV JÁRMAY, OF NORTHWICH, COUNTY OF CHESTER, ENGLAND.

SEPARATING AMMONIUM CHLORIDE.

SPECIFICATION forming part of Letters Patent No. 386,137, dated July 17, 1888.

Application filed October 15, 1887. Serial No. 252,477. (No specimens.) Patented in England August 14, 1886, No. 10,419.

*To all whom it may concern:*

Be it known that I, GUSTAV JÁRMAY, a subject of the Emperor of Austria, residing at Northwich, in the county of Chester, in the Kingdom of England, have invented certain new and useful Improvements in Separating Ammonium Chloride, (for which I have received Letters Patent in Great Britain, dated August 14, 1886, No. 10,419,) of which the following is a specification.

In my patent, No. 356,133, dated January 18, 1887, I described a process for separating ammonium chloride from liquors obtained in the manufacture of soda by the ammonia-soda process, wherein the liquors were cooled or refrigerated, the crystals abstracted, and the mother-liquor again saturated with sodium chloride, and again cooled or refrigerated to produce a second crop, the process being repeated as often as is requisite.

Now my present improvement consists in adding to the original liquor the entire amount of sodium chloride that could be taken up by these repeated saturations and coolings, and keeping the liquor constantly agitated and cooled until the ammonium chloride in solution is found to be replaced by sodium chloride. The amount of sodium chloride required for any liquor can be easily found in practice by trying a measured quantity of the liquor by the process described in my prior patent, above cited, and noticing the amount of sodium chloride taken up after repeating the operation till it ceases to yield further crystals of ammonium chloride. By this new variation of the process I obtain in one operation, after separating the ammonium chloride, a a mother-liquor, which can be used instead of brine in the ammonia-soda process.

I claim as my invention—

The improvement in treating the residual or ammonium-chloride liquors obtained in the ammonia-soda process, which consists in adding at one operation to these liquors the requisite quantity of sodium chloride to replace the ammonium chloride, such amount being greater than what would saturate the original ammonium chloride liquor, keeping the salt in suspension by constant agitation, and at the same time cooling, whereby the sodium chloride gradually replaces the ammonium chloride in the solution, and the latter salt separates out, and on the agitation ceasing falls to the bottom, whereby I obtain in one operation crystallized ammonium chloride and a mother-liquor applicable in the ammonia-soda process in the place of brine.

In testimony whereof I have signed my name to this specification in the presence of two subscribing witnesses.

GUSTAV JÁRMAY.

Witnesses:
   WM. P. THOMPSON,
   GEO. C. DYMOND.